(12) United States Patent
Ito et al.

(10) Patent No.: US 6,736,179 B2
(45) Date of Patent: May 18, 2004

(54) LAMINATION SYSTEM

(75) Inventors: Hideaki Ito, Kiryu (JP); Shunichi Kawamata, Kiryu (JP); Naotaka Sasaki, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 97 days.

(21) Appl. No.: 10/107,364

(22) Filed: Mar. 28, 2002

(65) Prior Publication Data
US 2002/0139483 A1 Oct. 3, 2002

(30) Foreign Application Priority Data
Mar. 29, 2001 (JP) ........................................ 2001-094477
Apr. 4, 2001 (JP) ........................................ 2001-105808

(51) Int. Cl.$^7$ .......................... B32B 31/00; B26D 5/28; B65H 26/00
(52) U.S. Cl. ..................... 156/351; 156/352; 156/354; 156/355; 156/353; 156/361; 156/378; 156/379
(58) Field of Search ................... 156/351, 352, 156/353, 354, 355, 361, 362, 363, 364, 367, 368, 378, 379

(56) References Cited

U.S. PATENT DOCUMENTS

| | | | |
|---|---|---|---|
| 5,653,846 A | * 8/1997 | Onodera et al. | 156/362 |
| 5,783,024 A | 7/1998 | Forkert | |
| 5,807,461 A | 9/1998 | Hagstrom | |
| 6,283,188 B1 | * 9/2001 | Maynard et al. | 156/521 |
| 6,409,872 B1 | * 6/2002 | Campion et al. | 156/264 |

* cited by examiner

Primary Examiner—Richard Crispino
Assistant Examiner—George R. Koch, III
(74) Attorney, Agent, or Firm—Birch, Stewart, Kolasch & Birch, LLP

(57) ABSTRACT

A lamination system comprises a first transfer means, a cutting means provided at the downstream of the first transfer means for cutting a laminate film, a second transfer means for transferring the cut laminate film, a card transfer means for transferring a card along a card transfer path that converges with the film transfer path at a point of convergence, and a thermocompression bonding means for laminating the cut laminate film with the card at the downstream of the point of convergence, in which a means for detecting a failure in cutting the laminate film is provided.

3 Claims, 8 Drawing Sheets

LAMINATION SYSTEM

BACKGROUND OF THE INVENTION

1. Field of the Invention

The present invention concerns a lamination system for thermocompression bonding of a transparent film on a surface of an ID card on which such as a photograph of a person and personal data are printed. More specifically, the present invention concerns an improvement of a wasteless type lamination system for laminating the transparent film on the surface of the ID card, successively cutting continuous transparent film that has been rolled on a supply roll into a predetermined length, in which a countermeasure for a failure in cutting process of the transparent film is provided.

2. Description of the Prior Art

Recently, ID cards of various type are being widely used. In order to protect an ID card from tampering or to improve the life of the ID card, a transparent film of about 30 microns in thickness is laminated by a thermocompression bonding on a surface of the ID card on which information data are printed. Lamination systems such as disclosed in U.S. Pat. No. 5,807,461 and U.S. Pat. No. 5,783,024 are known as systems suitable for such lamination.

In the lamination system disclosed in U.S. Pat. No. 5,807,461, a transparent film pre-cut in a predetermined shape (a patch) is mounted on a carrier (a base sheet). The carrier is provided with sensor marks (index markings) for detecting the position of the pre-cut patch on the carrier. The lamination system detects the sensor mark prior to the lamination to detect the position of the pre-cut patch, then tears the patch from the carrier and laminates the patch on the surface of the printed ID card by thermocompression bonding. Such lamination system is undesirable in view of the operation cost and the protection of environment, since the carrier is thrown away as waste material.

The above problem was solved in a lamination system disclosed in U.S. Pat. No. 5,783,024 and the system is being practically used. In this lamination system, a leading edge of a continuous transparent laminate film is drawn out from a supply roll, then transferred along a supply path, then cut in a predetermined length, then laid on a printed ID card transferred along another supply path at the convergence zone of the two supply paths, and then laminated on the surface of the ID card by thermocompression bonding using a heat roller provided at the downstream. This lamination system, called wasteless type lamination system, is advantageous since the laminate film is used after being cut in a necessary length, and accordingly, no waste carrier such as in the lamination system disclosed in U.S. Pat. No. 5,807,461 is left.

However, in such wasteless type lamination system as represented by U.S. Pat. No. 5,783,024, means for detecting a failure in cutting the laminate film by a cutter, that may be caused by exhaustion of service life of the cutter or by other factors, is not provided. Accordingly, there is a problem that, in case that an insufficient cutting of a continuous laminate film is made, the continuous laminate film is laminated on a printed ID card by thermocompression bonding and the printed ID card is heavily spoilt. Such problem causes the rise in the issuance cost of ID cards and prevents tamper-resistant and long life ID cards from spreading.

SUMMARY OF THE INVENTION

It is an object of the present invention to solve the above problem in the prior art and to provide a lamination system that is capable of detecting a failure in cutting of a laminate film, that contributes to lowering the running cost, and that can be provided at a low price.

A lamination system according to the present invention to achieve the above object comprises a first transfer means for transferring a continuous laminate film with a heat-adhesive layer drawn out from a supply roll along a film transfer path, a cutting means provided at the downstream of the first transfer means for cutting the laminate film into a predetermined length, a second transfer means provided at the downstream of the cutting means for transferring the cut laminate film along the film transfer path, a card transfer means for transferring a card along a card transfer path that converges with the film transfer path at a predetermined point of convergence, and a thermocompression bonding means for laminating the cut laminate film with the card at the downstream of the point of convergence, in which a means for detecting a failure in cutting the laminate film is provided.

Further according to the present invention, the means for detecting the failure in cutting the laminate film comprises a film detection means provided at the downstream of the second transfer means, a leading edge of the laminate film is detected by the film detection means, the laminate film is pulled back toward the upstream after cutting action of the cutting means, and the cutting is judged to have failed in cutting the laminate film if an output signal of the film detection means becomes inactivated.

Further according to the present invention, a transfer force of the first transfer means is larger than a transfer force of the second transfer means, the laminate film is pulled back toward the upstream after cutting action of the cutting means by the first transfer means only, and the laminate film is slipped in the second transfer means while being pulled back.

In this lamination system, it is possible to stop the successive lamination process and to take an appropriate recovery action to prevent the printed ID card from being spoilt, when the cutting of the laminate film is insufficient, since the means for detecting the failure in cutting process of the laminate film is provided.

The lamination system can be realized at a low price without adding any additional parts, in case that the transfer force of the first transfer means is made larger than a transfer force of the second transfer means, that the laminate film is pulled back toward the upstream after cutting action of the cutting means by the first transfer means only, and that the laminate film is slipped in the second transfer means while being pulled back.

In another aspect of the lamination system according to the present invention, the means for detecting the failure in cutting the laminate film comprises a film detection means, provided between the cutting means and the second transfer means, that detects the existing of the laminate film, a control means that controls the laminate film to be transferred a predetermined amount after a leading edge of the laminate film is detected by the film detection means is provided, the cutting means is driven to cut the laminate film when transferred length of the laminate film reaches the predetermined amount, then the cut laminate film is further transferred by another predetermined amount, then the existing of the laminate film is examined by the film detection means, and the cutting is judged to have failed in cutting the laminate film if the existing of the laminate film is detected.

In this lamination system, it is also possible to stop the successive lamination process and to take an appropriate recovery action to prevent the printed ID card from being spoilt, when the cutting of the laminate film is insufficient, since the means for detecting the failure in cutting process of the laminate film is also provided.

DETAILED DESCRIPTION OF THE INVENTION

Figure 1:
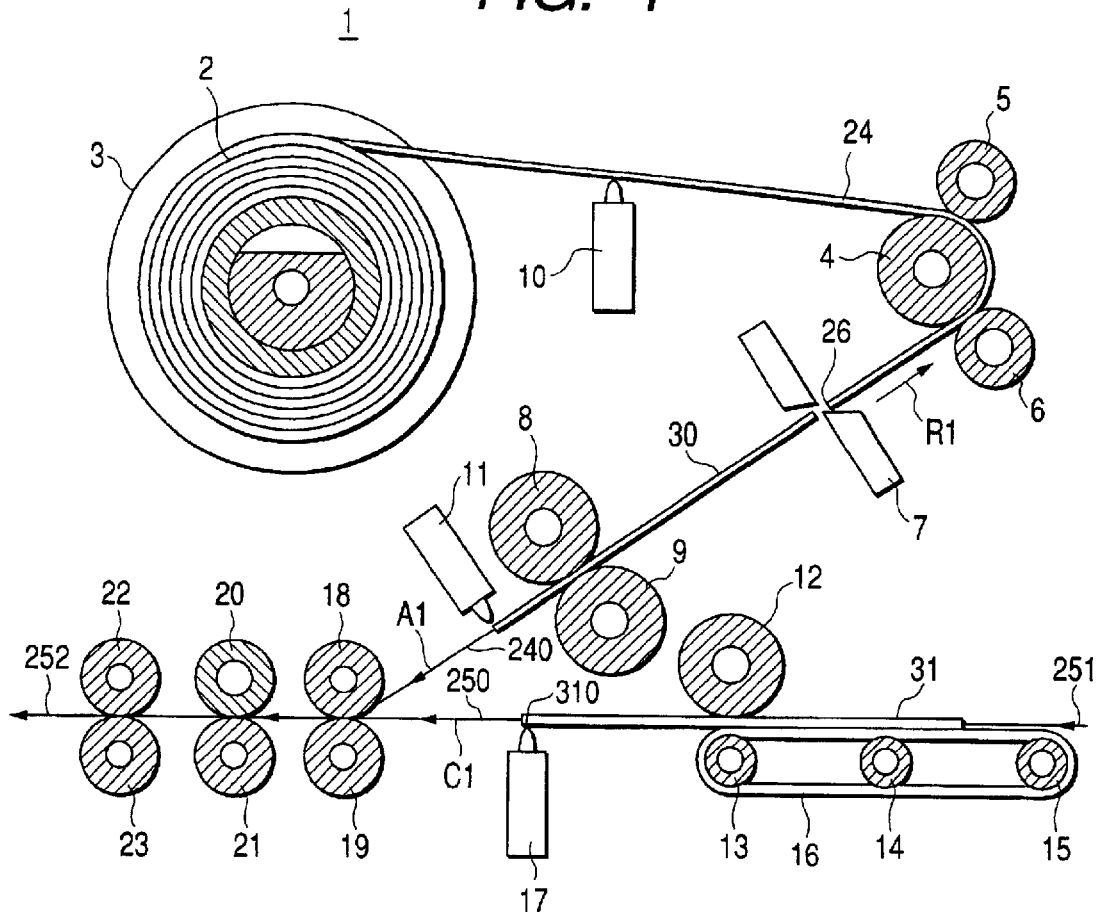
FIG. 1 shows a construction of a lamination system according to the present invention.

FIG. 1 shows a construction of a lamination system 1 of the first embodiment according to the present invention. In the lamination system 1 of the first embodiment according to the present invention, a continuous transparent laminate film 24 is loaded in a form of a supply roll 2 on a supply spindle 3. A leading edge 29 of the laminate film 24 is drawn out from the supply roll 2 and transferred along a film transfer path 240. A laminate film supply monitoring sensor 10 composed of an optical sensor represented by a reflective type optical sensor is provided along the film transfer path 240. The supply monitoring sensor 10 monitors the existence of the laminate film 24 in the film transfer path 240. The laminate film 24 is hung on a roller 4 composing a first transfer means, then passed between two cutting blades of a cutter 7, then transferred thorough a second transfer means composed of a roller 8 and roller 9, and then passed under a film detection sensor 11 composed of an optical sensor also represented by a reflective type optical sensor.

On the other hand, a printed ID card 31 is put into an inlet 251 of the lamination system 1. Then the printed ID card 31 is transferred on a belt 16 driven by rollers 13 to 15, then transferred along a card transfer path 250 being held by the belt 16 located on the roller 13 and a roller 12 opposing to the belt 16, and then transferred to a point of convergence, composed of a roller 18 and a roller 19, at which the film transfer path 240 and card transfer path 250 converge, after being positioned for registration by a card edge detection sensor 17 composed of an optical sensor also represented by a reflective type optical sensor.

Figure 2:
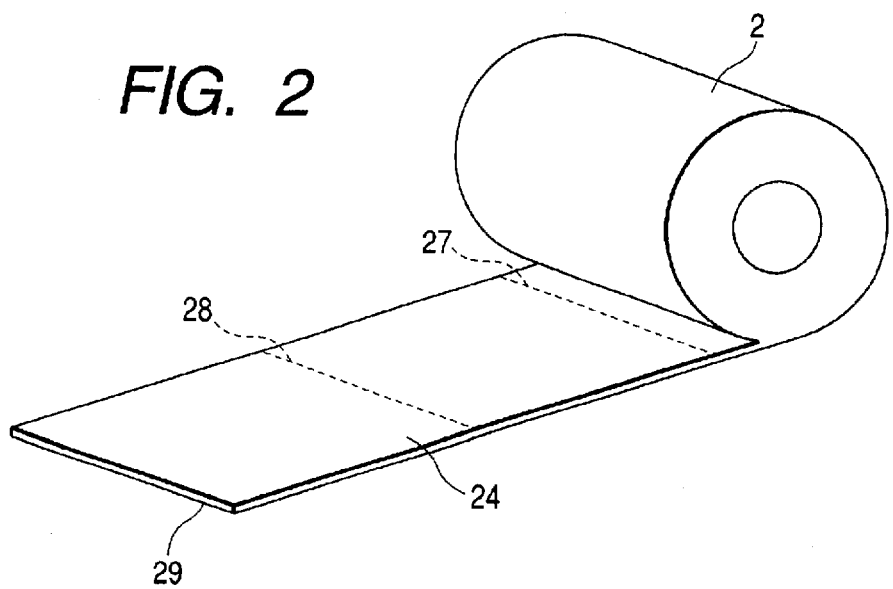
FIG. 2 is a schematic perspective view of an example of a supply roll of a laminate film suitable for use in the practise of the present invention.
Figure 3:
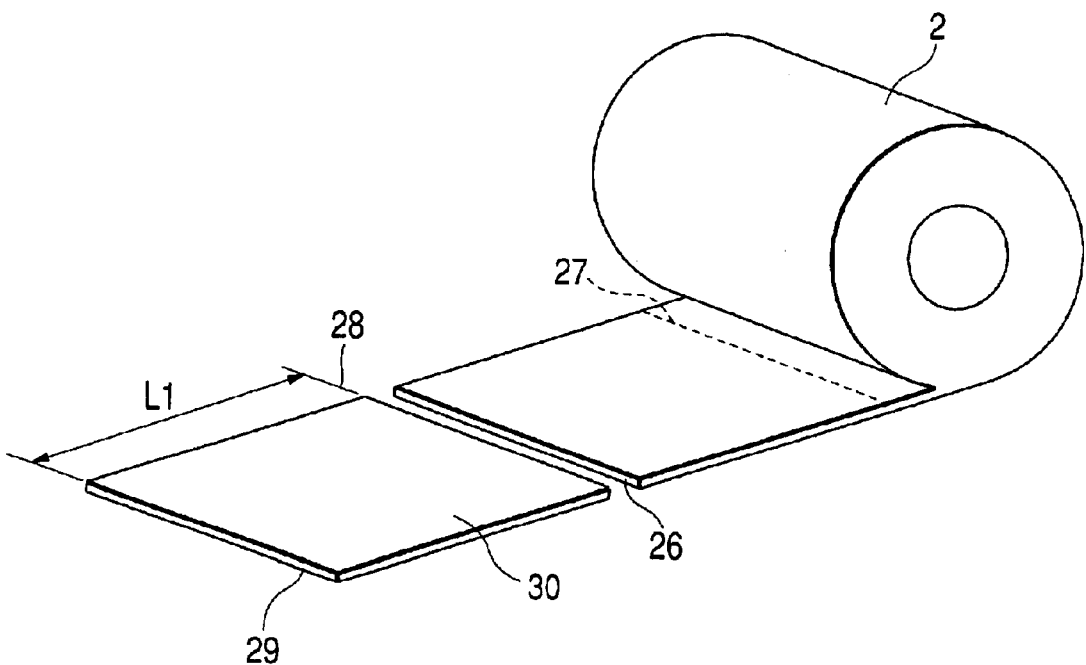
FIG. 3 is a schematic perspective view of the supply roll of the laminate film in FIG. 2 after the laminate film has been cut from the supply roll.

As shown in FIG. 2, the leading edge 29 of a continuous laminate film 24 is drawn out from the supply roll 2 and cut successively along a cutting line 28, a cutting line 27 and so forth by the cutter 7. The continuous laminate film 24 may be a transparent film, or may be a film treated to have hologram surface for prevent from forgery. In the actual process, when the leading edge 29 of the continuous laminate film 24 is detected by the film detection sensor 11, the transfer of the continuous laminate film 24 is once stopped and cut by the cutter 7. FIG. 3 shows the cut laminate film 30. As shown, the continuous laminate film 24 is cut along the cutting line 28 at a distance L1 from the leading edge 29. A cut edge 26 becomes a new leading edge of the continuous laminate film 24 to be cut next. The length L1 is adjusted by fine adjustment of relative distance between the film detection sensor 11 and the cutter 7, or by transferring the continuous laminate film 24 a little after the leading edge 29 is detected by the film detection sensor 11.

Figure 4:
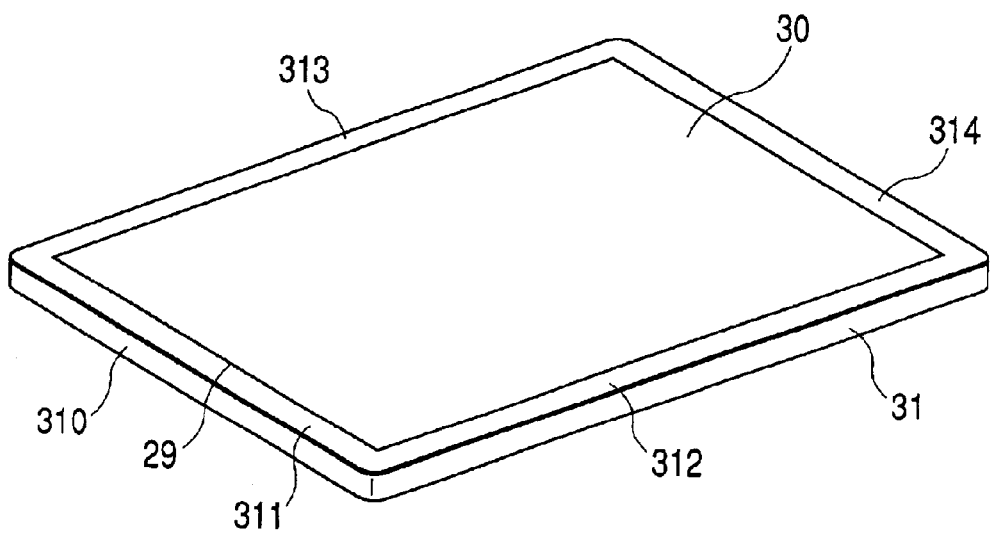
FIG. 4 is a perspective view of a printed ID card on the surface of which lamination is completed by the lamination system according to the present invention.

The cut laminate film 30 is laid on the printed ID card 31 at the point of convergence, then transferred between a heat roller 20 and a platen roller 21 provided at the downstream and laminated by thermocompression bonding. After that, the laminated ID card 31 is transferred through rollers 22 and 23 to be discharged from an outlet 252. The printed ID card on which the lamination is completed is shown in FIG. 4. As shown in the drawing, the cut laminate film 30 is laminated on the printed ID card 31 with blank spaces 311 to 314 along four sides of the printed ID card 31. Accordingly, it is necessary to precisely control the transfer of the cut laminate film 30 and the printed ID card to make the desired blank spaces provided on the ID card. The blank spaces are indispensable to keep the effect of the lamination, since a surplus portion of the laminate film coming out of an edge of the printed ID card tends to peel off. Accordingly, the continuous laminate film 24 needs to be cut certainly along the predetermined cutting line.

Now, method for ascertaining the cutting of the laminate film is explained.

Figure 5:
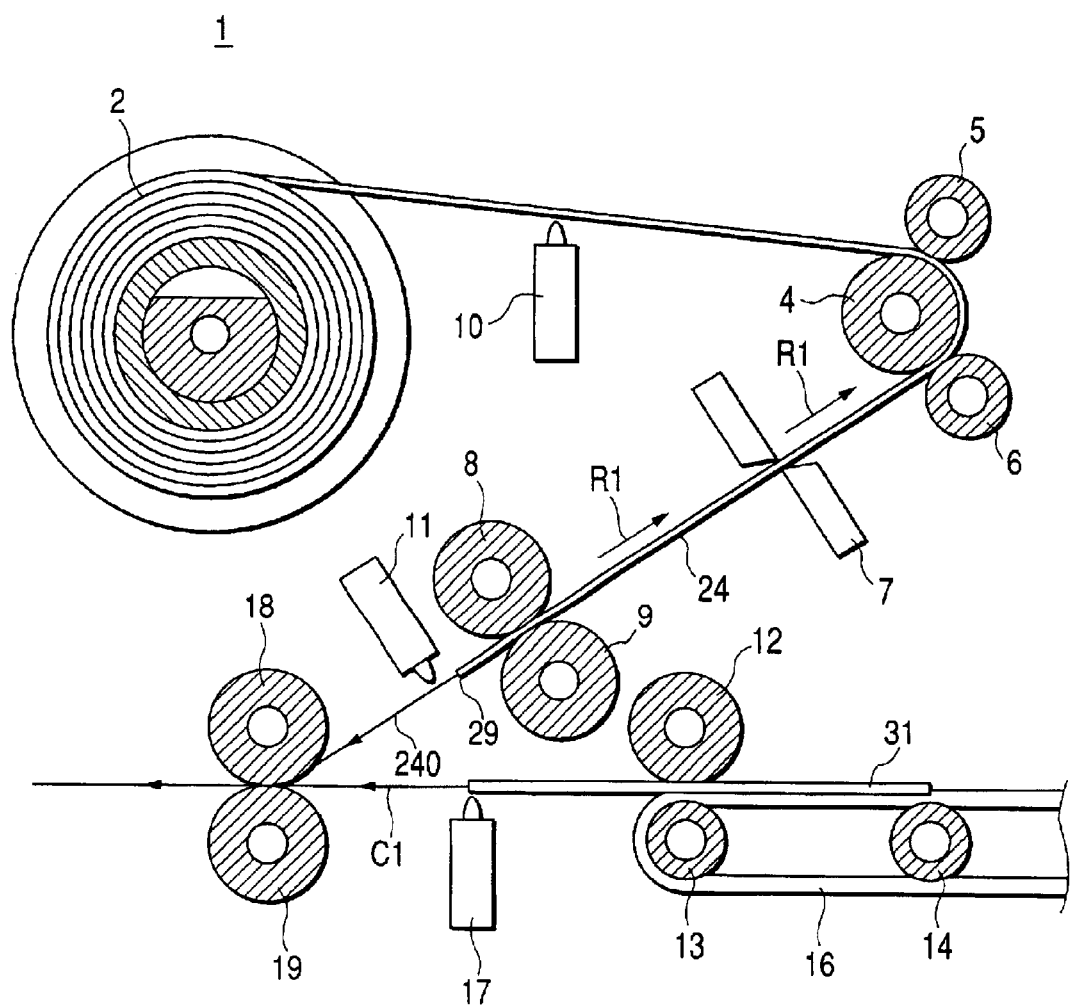
FIG. 5 shows a state in which a failure in cutting of the laminate film has occurred in the lamination system according to the present invention.

In FIG. 1, a state in which cutting of the laminate film 24 has been made successfully is shown, whereas in FIG. 5, a state in which a failure in cutting of the laminate film 24 has occurred is shown. As explained above, when the leading edge 29 of the continuous laminate film 24 drawn out from the supply roll 2 is detected by the film detection sensor 11 and an output of the film detection sensor 11 is activated, then the transfer of the laminate film 24 is stopped and cutting of the laminate film 24 by the cutter 7 is practised. After the cutting is finished, the roller 4 of the first transfer means is rotated counter clockwise to have the laminate film 24 pulled back by several millimeters. At this time, the rollers 8 and 9 composing the second transfer means are kept stopping. If the cutting of the laminate film 24 has been made successfully, then only the continuous laminate film 24 is pulled back in a direction indicated by an arrow R1, and the cut laminate film 30 remains in its place. As a result, the output of the film detection sensor 11 remains activated. Then, the cutting of the laminate film 24 is judged to have been made successfully and the cut laminate film 30 is transferred in a direction indicated by an arrow A1. At the same time, the printed ID card 31 is also transferred in a direction indicated by an arrow C1 and the lamination is practised at the downstream.

If a failure in cutting of the laminate film 24 has occurred, when the laminate film 24 is pulled back in the direction indicated by the arrow R1 after cutting action, the laminate film 24 existing between the cutter 7 and the rollers 8 and 9 of the second transfer means is also pulled back in the direction indicated by the arrow R1, as shown in FIG. 5, the leading edge 29 of the laminate film 24 goes away from the film detection sensor 11, and the output of the film detection sensor 11 changes from being activated into inactivated. Accordingly, whether the cutting has been made successfully or not can be judged by examining the output signal of the film detection sensor 11, pulling back the laminate film 24 by a predetermined length after the cutting action to the laminate film 24 is finished.

Additionally, the transfer force of the first transfer means comprising the rollers 4, 5 and 6 is made larger than the transfer force of the second transfer means comprising the rollers 8 and 9. As a result, in case that a failure in cutting of the laminate film 24 has occurred, the laminate film 24 pulled back in the direction indicated by the arrow R1 by the rollers 4 to 6, while keeping the rollers 8 and 9 being stopped, is transferred in the direction indicated by the arrow R1 slipping between the rollers 8 and 9. Thus, the judgement whether the cutting has been made successfully or not can be made without adding additional devices such as one-way clutch and the like to the drive shafts (not illustrated) of the rollers 8 and 9.

Figure 6:
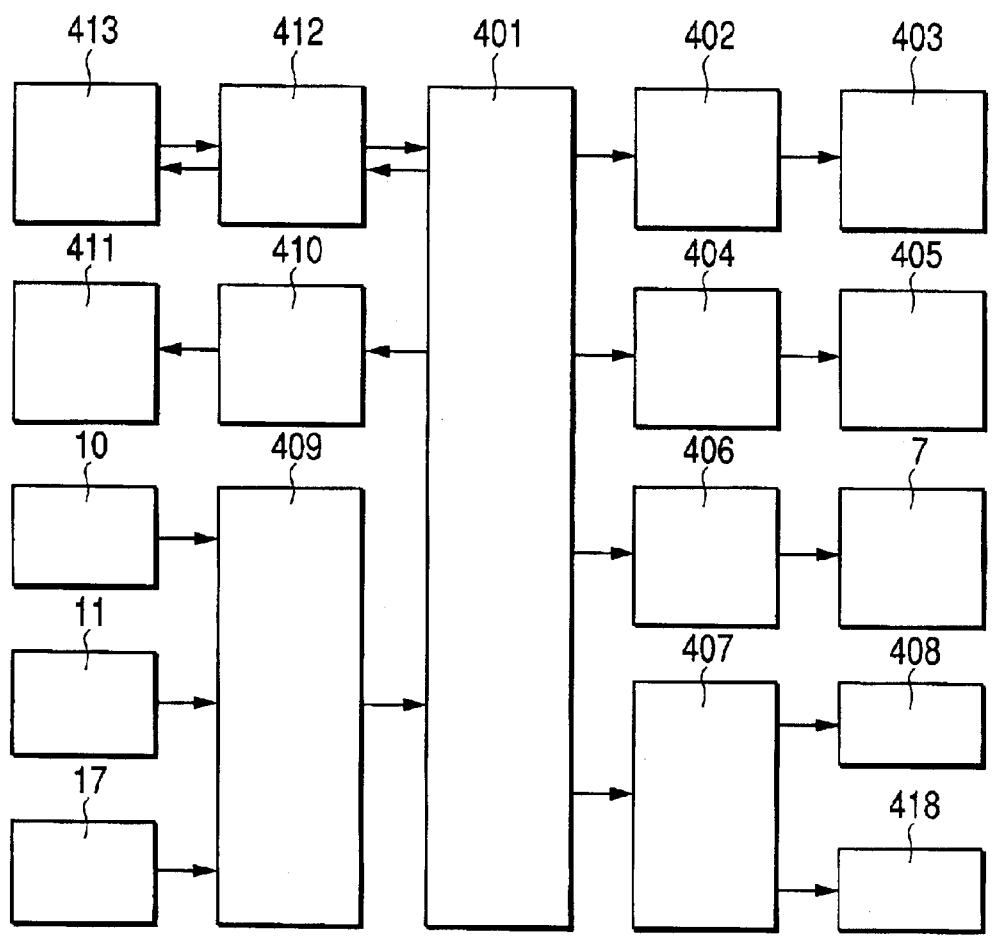
FIG. 6 is a block diagram of an example of a controller adopted in the lamination system according to the present invention.

FIG. 6 shows a block diagram of a controller mounted in the lamination system 1. The controller comprises; a central processing unit 401 composed of micro processors and the like, a card transfer control circuit 402, a card transfer motor 403, a laminate film transfer control circuit 404, a laminate film transfer motor 405, a cutter drive circuit 406, a clutch drive circuit 407, a laminate load electric clutch 408, a laminate feed electric clutch 418, a sensor signal processing circuit 409, a heater temperature control circuit 410, a heater 411, a control panel signal processing circuit 412 and a control panel 413.

The laminate load electric clutch 408 is used to connect or disconnect driving force of the laminate film transfer motor 405 to the roller 4. The laminate feed electric clutch 418 is used to connect or disconnect driving force of the laminate film transfer motor 405 to the roller 8. The rollers 5 and 6 are connected to the roller 4 through gears provided with respective shafts (not illustrated). Also, The rollers 8 and 9 are connected with each other through gears provided with respective shafts (not illustrated). The rollers 12 to 15 provided along the card transfer path 250 are driven by the drive force of the card transfer motor 403 and transfer the ID card 31.

Operation of the controller with regard to the judgement whether the cutting has been made successfully or not, and the corresponding action based on the result of the judgement, is as follows:

First, the processing unit 401 instructs, through laminate film transfer control circuit 404, the laminate film transfer motor 405 to rotate to draw out the continuous laminate film 24 from the supply roll 2. At the same time, the laminate load electric clutch 408 and the laminate feed electric clutch 418 are activated, the roller 4 and the roller 8 are rotated being synchronized with each other, and the laminate film 24 is transferred until the leading edge 29 reaches a responsive position of the film detection sensor 11. When the leading edge 29 of the laminate film 24 reaches the responsive position of the film detection sensor 11, the output of the film detection sensor 11 becomes activated. The activated output signal is transmitted through the sensor signal processing circuit 409 into the processing unit 401. In response to the activated output signal, the processing unit 401 stops the rotation of the laminate film transfer motor 405, and drive the cutter 7 to cut the laminate film 24. After that, the laminate feed electric clutch 418 is inactivated, whereas the laminate load electric clutch 408 is kept being activated. Then the laminate film transfer motor 405 is rotated reversely by a predetermined amount, and then stopped. At this time, if the output signal of the film detection sensor 11 is kept activated, then the cutting of the laminate film 24 is judged to have been made successfully. Then, the laminate feed electric clutch 418 is activated again, the laminate load electric clutch 408 is inactivated, and the laminate film transfer motor 405 is driven in the normal rotational direction to transfer the cut laminate film 30 to the downstream. At this time, the card transfer motor 403 is driven, a leading edge 310 of the printed ID card 31 is detected by the card edge detection sensor 17, and the printed ID card 31 is transferred being synchronized with the cut laminate film 30 toward the downstream where the lamination is made.

In the above process, when the laminate feed electric clutch 418 is inactivated, the laminate load electric clutch 408 is kept activated, and the laminate film transfer motor 405 is rotated reversely by a predetermined amount of rotation and then stopped, if the output signal of the film detection sensor 11 becomes inactivated, then the processing unit 401 judges that a failure in cutting of the laminate film 24 has occurred. Then, the processing unit 401 transmits an error message to the control panel signal processing circuit 412 to display an error information on the control panel 413 warning an operator to take an appropriate action, and stops the succeeding operation. As a result, transfer of the printed ID card 31 into lamination process is also stopped.

In the above explanation of the present invention, the explanation is made for a case in which the card transfer motor 403 and the laminate film transfer motor 405 are provided separately as the drive sources of the lamination system. However, it is quite apparent that the same effects of the present invention can be achieved using a single motor connected to a plurality of electric clutches to connect/disconnect drive force to the respective rollers. Also, although the explanation is made for a case in which the reflective type optical sensors are used as the sensors 10, 11 and 17 for detecting the laminate films 24, 30 or the printed ID card 31, it is also quite apparent that the same effects of the present invention can be achieved using sensors of another types. Additionally, PVC are being generally used as the materials of the ID card to be laminated. The lamination system of the present invention can be used for a card made of a composite material such as PET-G, and further, the lamination system of the present invention can be used for any card regardless of the material of which the card is made. Further, the object to be laminated by the lamination system of the present invention is not limited to ID card. The lamination system of the present invention is applicable to a lamination of a continuous film, being successively cut, on a substrate in the form other than the ID card.

In the lamination system as explained above, a failure in cutting of the laminate film 24 by the cutter 7 in the cutting process can be detected by inspecting the output signal of the film detection sensor 11 after pulling back the laminate film 24 by a predetermined amount. Accordingly, in case that the cutting of the laminate film 24 is insufficient, it is possible to stop the succeeding process, to take an appropriate action to recover from the failure, and to prevent the printed ID card 31 from being spoilt. Further, in case that the transfer force of the first transfer means is made larger than the transfer force of the second transfer means, and that the pulling back of the laminate film 24 after the cutting action is made using the first transfer means only, having the laminate film 24 slipped in the second transfer means, the lamination system 1 can be realized at a low cost without adding any additional parts.

Figure 7:
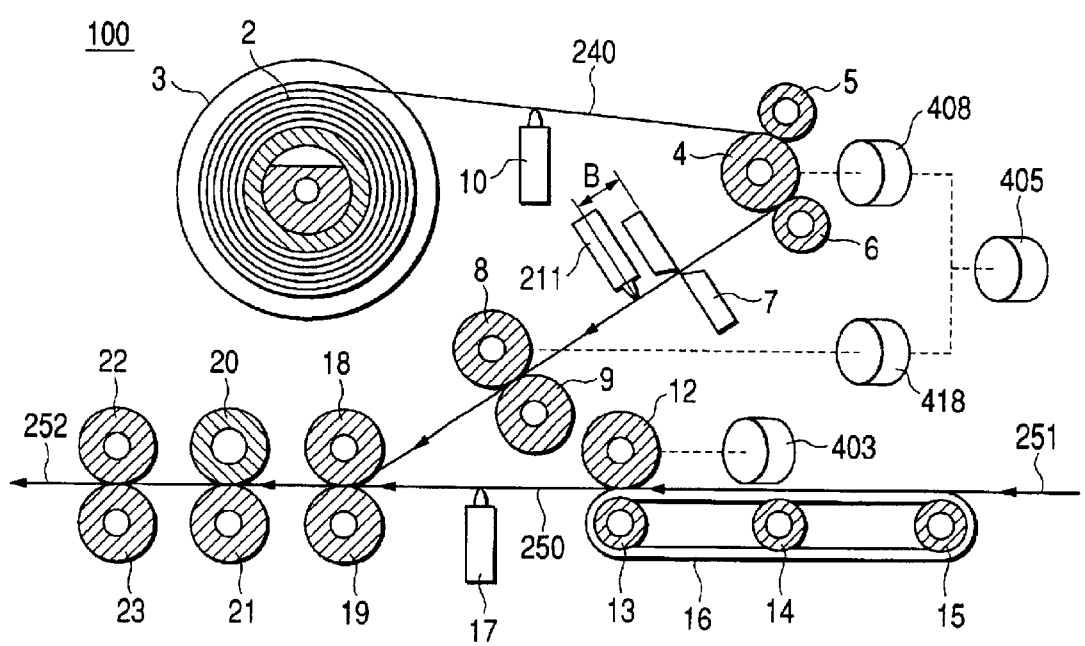
FIG. 7 shows a construction of another lamination system according to the present invention.

Now, the second embodiment of the lamination system 100 according to the present invention is explained referring to FIG. 7. In the first embodiment, the film detection sensor 11 is placed at the downstream of the second transfer means. In the second embodiment of the lamination system 100, a film detection sensor 211, also represented by a reflective type optical sensor, is placed between a cutter 7 and a second transfer means, in place of the film detection sensor 11. A laminate film 24 is hung on a roller 4 composing a first transfer means, then passed between two cutting blades of a cutter 7, then passed under the film detection sensor 211, and then transferred to the second transfer means composed of rollers 8 and 9. A distance B between the cutter 7 and the film detection sensor 211 is predetermined as a design factor of the system. The lamination system 100 is constructed similar to the lamination system 1 in the first embodiment, except that the film detection sensor 211 is provided in place of the film detection sensor 11.

Drive force of a laminate film transfer motor 405 is transmitted to the roller 4 through a laminate load electric clutch 408. The drive force is transmitted to rollers 5 and 6 through the roller 4 and the respective gears (not illustrated). Similarly, the drive force is transmitted to a roller 8 through a laminate feed electric clutch 418, and from the roller 8 to a roller 9 through a gear (not illustrated). In this embodiment, a stepping motor is adopted as the laminate film transfer motor 405. Since an amount of rotation of a stepping motor can be precisely and easily controlled by controlling a number of drive pulses, amounts of rotation of the roller 4 and the roller 8 can also be precisely and easily controlled. Further, by combining on/off controls of the laminate load electric clutch 408 and the laminate feed electric clutch 418, with the control of the amounts of rotation of the rollers, transfer of the laminate film 24 can be made minutely. A card transfer motor 403 is also provided with a card transfer system and a stepping motor is also adopted. Accordingly, transfer of an ID card 31 can be minutely controlled by controlling a number of drive pulses for the card transfer motor 403. Drive force of the card transfer motor 403 is transmitted to a roller 12, and then from a drive shaft (not illustrated) of the roller 12 to rollers 13 and 18, a heat roller 20 and a roller 22 through such as gears and/or synchronous belts (not illustrated). The drive force is also transmitted from these rollers to rollers opposing to these rollers through the respective gears (not illustrated).

Additionally, the laminate film transfer motor 405 can be omitted. In this case, the drive force of the card transfer motor 403 is transmitted to the rollers in the laminate film transfer system through an electric clutch. The control of the transfer of the laminate film 24, 30 similar to that explained above can also be made. Further, a servomotor such as a rotary encoder with a number of rotation sensor can be used as the drive source in place of the stepping motor. In this case, control of the transfer can also be made similarly to the case explained above.

Form of the laminate film 24 or 30 before or after being cut and process of the thermocompression bonding of the cut laminate film 30 on the printed ID card are same to those explained referring to FIGS. 2 to 4 in the first embodiment, and the explanation is omitted. Further, same to the case explained before, it is necessary to provide blank spaces 311 to 314 along the sides of the laminated ID card 31 for protecting the cut laminate film 30 from peeling off, and accordingly, the continuous laminate film 24 needs to be cut certainly and precisely along cutting lines.

Now, cutting process of the continuous laminate film 24 is explained.

Figure 8:
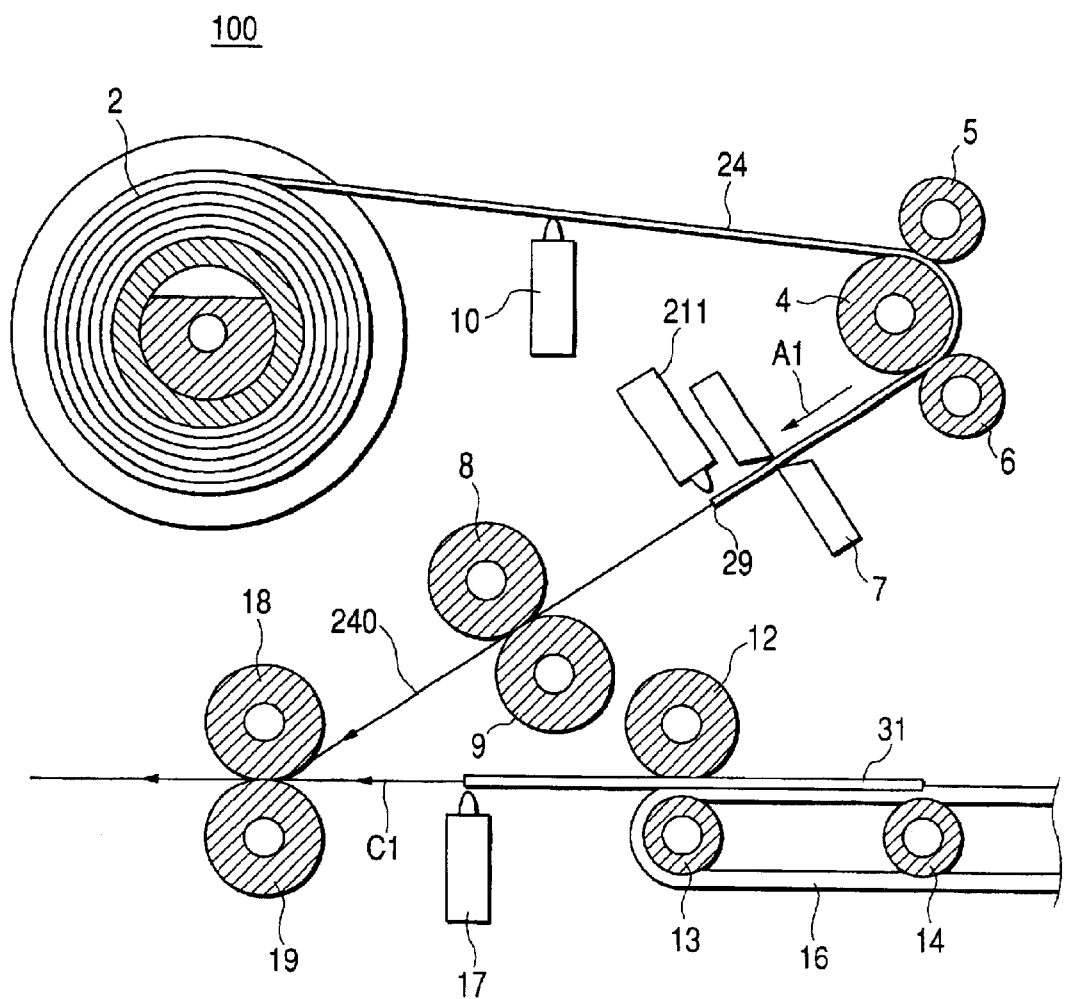
FIG. 8 shows a state in which a leading edge of the laminate film is detected in the lamination system shown in FIG. 7.
Figure 9:
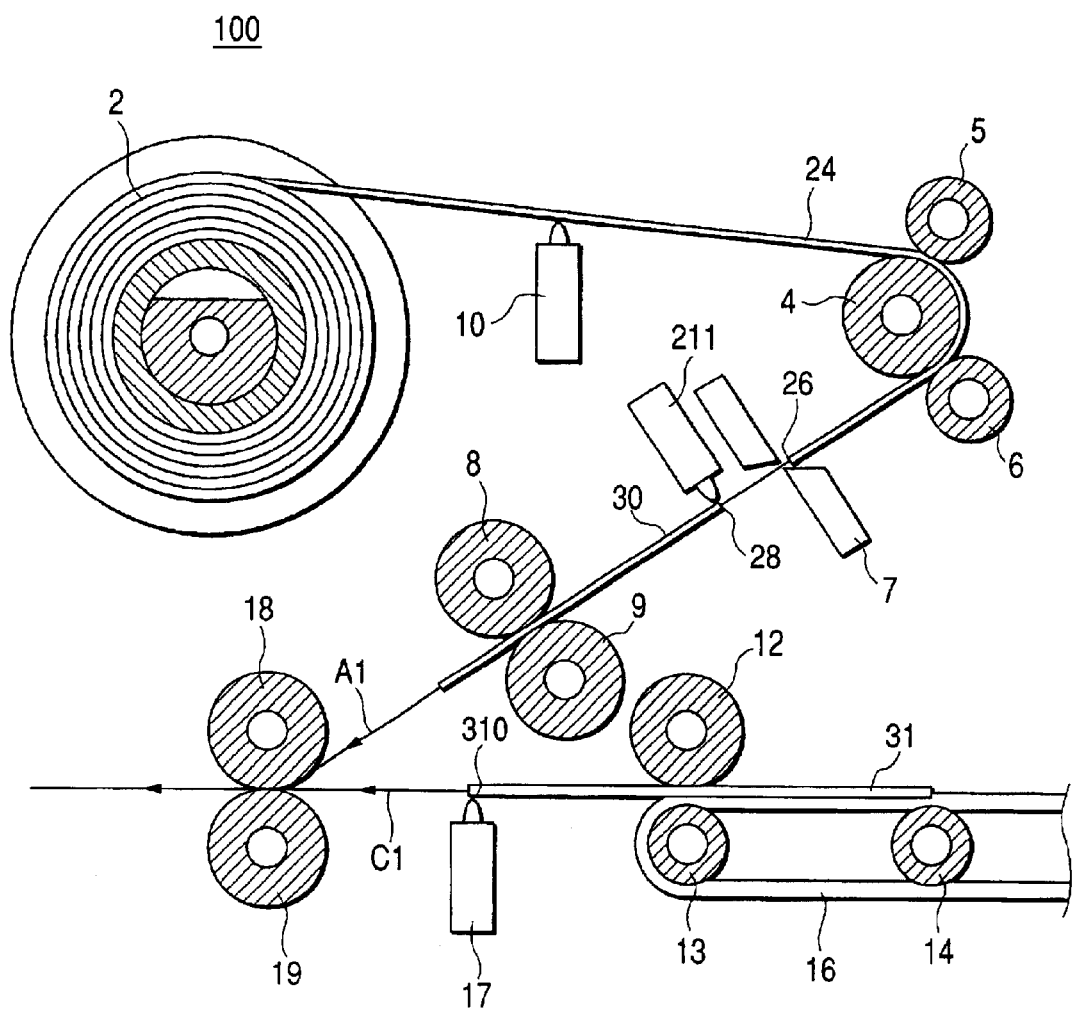
FIG. 9 shows a state in which cutting of the laminate film has been made successfully in the lamination system shown in FIG. 7.
Figure 10:
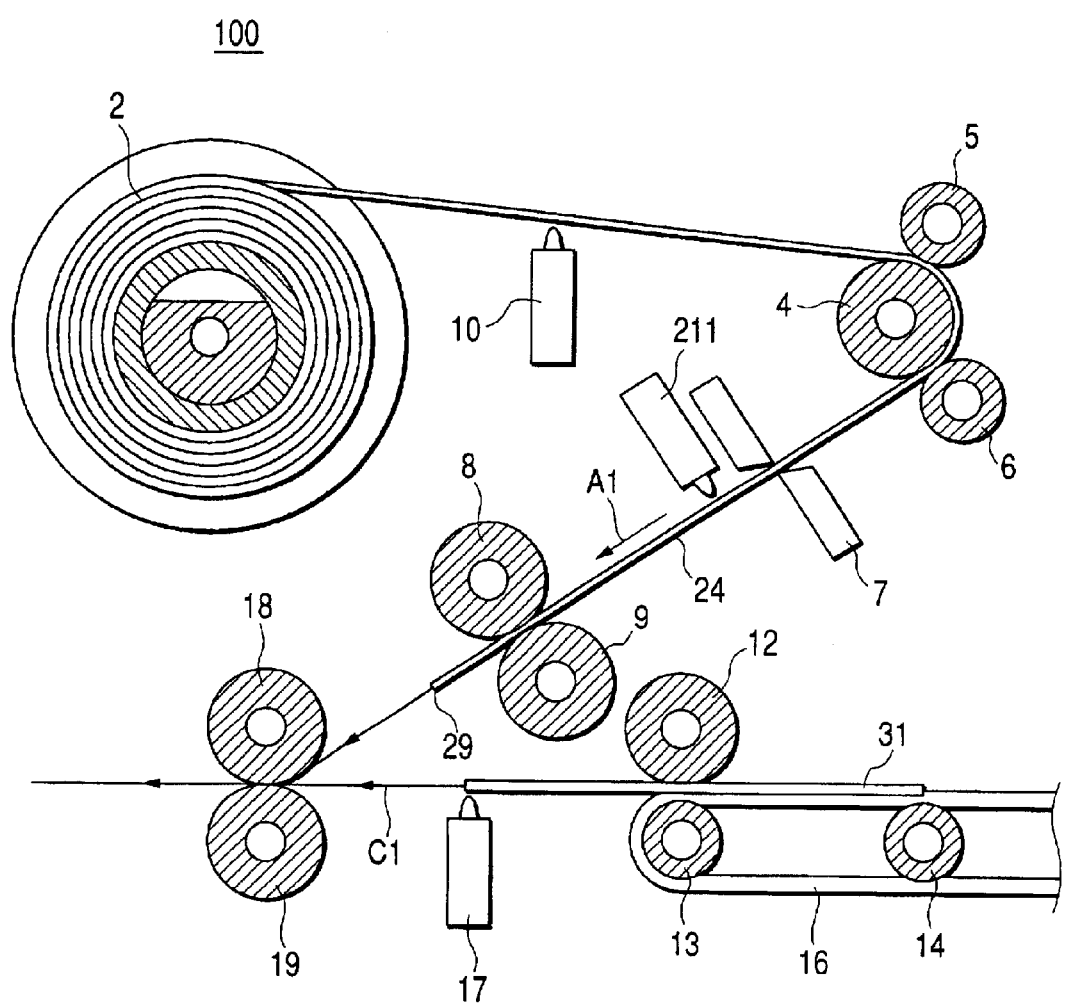
FIG. 10 shows a state in which a failure in cutting of the laminate film has occurred in the lamination system shown in FIG. 7.

FIG. 8 shows a process for determining the cutting line before cutting the continuous laminate film 24. FIG. 9 shows a state in which cutting of the laminate film 24 has been made successfully. Also, FIG. 10 shows a state in which a failure in cutting of the laminate film 24 has occurred. In the following explanation, both of the laminate load electric clutch 408 and the laminate feed electric clutch 418 shown in FIG. 7 are activated to be capable of transmitting drive forces. When the leading edge 29 of the continuous laminate film 24 drawn out from a supply roll 2, being driven by the laminate film transfer motor 405, is detected by the film detection sensor 211, an output signal of the film detection sensor 211 is activated. Then, in order to determine a position on the laminate film 24 at which the laminate film 24 is to be cut, the lamination system 100 transmits a drive command pulse to the laminate film transfer motor 405 to transfer the laminate film 24 by a distance corresponding to (L1−B), where L1 is a length of the cut laminate film 30 and B is a distance between the film detection sensor 211 and the cutter 7. After that, the laminate film transfer motor 405 is stopped to stop the transfer of the laminate film 24. Then, the cutter 7 is driven to cut the laminate film 24, and the cut laminate film 30 is made on a film transfer path 240, as shown in FIG. 9. After that, the laminate load electric clutch 408 is inactivated and the laminate film transfer motor 405 is started. Then, the drive force of the laminate film transfer motor 405 is transmitted to the rollers 8 and 9 through the laminate feed electric clutch 418, and the cut laminate film 30 is transferred in the direction indicated by an arrow A1.

Now, method for ascertaining the cutting of the laminate film is explained. As explained above, when the leading edge 29 of the continuous laminate film 24 drawn out from a supply roll 2 is detected by the film detection sensor 211, an output signal of the film detection sensor 211 is activated. Then, in order to determine the position on the laminate film 24 to be cut, the laminate film 24 is transferred by the distance corresponding to (L1−B). Then, the laminate film transfer motor 405 is stopped to stop the transfer of the laminate film 24, and the cutter 7 is driven to cut the laminate film 24. After the cutting action of the cutter 7 is finished, a drive command pulse to transfer the cut laminate film 30 by a distance slightly longer than B that is the distance between the film detection sensor 211 and the cutter 7 is transmitted to the laminate film transfer motor 405. The transfer of the cut laminate film 30 is made monitoring if the output signal of the film detection sensor 211 is varied from activated into inactivated. If the cutting of the laminate film 24 has been made successfully, then the output signal of the film detection sensor 211 is varied from activated into inactivated after a trailing edge 28 of the cut laminate film 30 has passed under the film detection sensor 211. Accordingly, while monitoring the variation in the output signal of the film detection sensor 211, if the output signal of the film detection sensor 211 changes from activated into inactivated, then the cutting of the laminate film 24 is judged to have been made successfully, the cut laminate film 30 is transferred in a direction indicated by an arrow A1 and transferred to the downstream to be laminated.

If a failure in cutting of the laminate film 24 has occurred, the output signal of the film detection sensor 211 is kept activated, since no trailing edge 28 appears when the transfer control to make the laminate film 24 transferred in the direction indicated by the arrow A1 is made after cutting action. If it is the case, the lamination system 100 judges that the failure in cutting of the laminate film 24 has occurred, displays an error information on a control panel 413 to warn an operator to take an appropriate action, and stops the succeeding operation. As a result, transfer of the printed ID card 31 into lamination process is also stopped. Thus, if the cutting of the laminate film 24 has been finished successfully or not can be judged by further transferring the cut laminate film 30 (or the continuous laminate film 24) by a predetermined distance after the cutting action of the laminate film 24 is finished and by monitoring the output signal of the film detection sensor 211.

The printed ID card 31 is transferred along a card transfer path 250 shown in FIG. 8 in a direction indicated by an arrow C1. An amount of the transfer of the printed ID card 31 is controlled by the roller 12 connected to the card transfer motor 403 that is controlled by a command pulse, using a point at which a leading edge 310 of the printed ID card 31 is detected by a card edge detection sensor 17 represented by a reflective type optical sensor as the reference point. The cut laminate film 30 is laid on the printed ID card 31 at a point of convergence of the film transfer path 240 and the card transfer path 250 such that blank spaces of approximately even sizes are provided along four sides of the printed ID card 31. Then the cut laminate film 30 and the printed ID card 31 are transferred to a place between a heat roller 20 and a platen roller 21 provided at the downstream. The transfer of the cut laminate film 30 and the transfer of the printed ID card 31 are synchronized with each other. Lamination of the cut laminate film 30 on the printed ID card 31 is made by thermocompression bonding at the place between the heat roller 20 and the platen roller 21. After that, the ID card 31 on which the lamination is completed is transferred through rollers 22 and 23 to be discharged from an outlet 252.

The lamination system 100 of this embodiment is also controlled by a controller similar to the processing unit 401 shown in FIG. 6 and explained before with regard to the first embodiment. Accordingly, operation of the controller with regard to the present embodiment is explained below also referring to FIG. 6.

First, the processing unit 401 instructs, through laminate film transfer control circuit 404, the laminate film transfer motor 405 to rotate to draw out the continuous laminate film 24 from the supply roll 2. At the same time, the laminate load electric clutch 408 and the laminate feed electric clutch 418 are activated, the rollers 4 and 8 are rotated being synchronized with each other, and the laminate film 24 is transferred until the leading edge 29 reaches a responsive position of the film detection sensor 211. When the leading edge 29 of the laminate film 24 reaches the responsive position of the film detection sensor 211, the output of the film detection sensor 211 becomes activated. The activated output signal is transmitted through the sensor signal processing circuit 409 into the processing unit 401. The processing unit 401 stores temporarily a point at which the activated output signal is transmitted as a position information. Using the point at which the activated output signal is transmitted as a reference point, the laminate film 24 is transferred by the distance corresponding to (L1–B) to determine the position on the laminate film 24 to be cut. After that the transfer of the laminate film 24 is stopped and the cutter 7 is driven through the cutter drive circuit 406 to cut the laminate film 24.

After that the processing unit 401 transmits a drive command pulse to the laminate film transfer motor 405 to transfer the cut laminate film 30 by a distance a little longer than the distance B between the film detection sensor 211 and the cutter 7. The processing unit 401 transmits the drive pulse command while monitoring if the output signal of the film detection sensor 211 transmitted through the sensor signal processing circuit 409 is varied from activated into inactivated state. If the output signal of the film detection sensor 211 is varied from activated into inactivated state due to passage of the trailing edge 28 of the cut laminate film 30, then the processing unit 401 judges that the cutting of the laminate film 24 has been successfully finished and transfers the cut laminate film 30 in the direction indicated by the arrow A1 in FIG. 9.

The leading edge 310 of the printed ID card 31 is detected by the card edge detection sensor 17. The detected signal of the card edge detection sensor 17 is transmitted through the sensor signal processing circuit 409 into the processing unit 401. The processing unit 401 stores temporarily a point at which the signal is detected as a position information in an internal memory device. The position information stored in the processing unit 401 is used as a reference point in subsequent card transfer control. The printed ID card 31 is transferred along the card transfer path 250 in the direction indicated by the arrow C1. An amount of transfer of the printed ID card 31 is controlled by the roller 12 connected to the card transfer motor 403 that is driven by a command pulse.

The cut laminate film 30 is also transferred synchronized with the printed ID card 31, and laid on the printed ID card 31 at the point of convergence of the film transfer path 240 and the card transfer path 250. The printed ID card 31 on which the cut laminate film 30 is laid is transferred into the place between the heat roller 20 and the platen roller 21. In the central portion of the heat roller 20, a heater 411 is provided. Temperature of the heater 411 is controlled by a heater temperature control circuit 410 to make the temperature at the surface of the heat roller 20 proper for the lamination. Thus, the cut laminate film 30 is certainly laminated on the surface of the ID card 31 by thermocompression bonding.

In the above explained process for judging if the cutting of the laminate film 24 has been made successfully or not, when the laminate film is transferred by the laminate film transfer motor 405 rotated by the predetermined amount of rotation and then stopped, while having the laminate load electric clutch 408 inactivated and having the laminate feed electric clutch 418 activated, if the output signal of the film detection sensor 211 is kept activated since no trailing edge 28 appears, the processing unit 401 judges that a failure in cutting the laminate film 24 has occurred. Then, the processing unit 401 displays an error information on a control panel 413 to warn an operator to take an appropriate action, and stops the succeeding operation. As a result, transfer of the printed ID card 31 into lamination process is also stopped.

In the above explanation of the present invention, the explanation is made for a case in which the card transfer motor 403 and the laminate film transfer motor 405 are provided separately as the drive sources of the lamination system. However, it is quite apparent that the same effects of the present invention can be achieved using a single motor connected to a plurality of electric clutches to connect/disconnect drive force to the respective rollers. Also, although the explanation is made for a case in which the reflective type optical sensors are used as the sensors 10, 17 and 211 for detecting the laminate films 24 and 30 or the printed ID card 31, it is also quite apparent that the same effects of the present invention can be achieved using sensors of another types. Additionally, PVC are being generally used as the materials of the ID card to be laminated. The lamination system of the present invention can be used for a card made of a composite material such as PET-G, and further, the lamination system of the present invention can be used for any card regardless of the material of which the card is made. Further, the object to be laminated by the lamination system of the present invention is not limited to ID card. The lamination system of the present invention is applicable to a lamination of a continuous film, being successively cut, on a substrate in the form other than the ID card.

In the lamination system as explained above, a failure in cutting of the laminate film 24 by the cutter 7 in the cutting process can be detected by examining if the laminate film exists or not between the film detection sensor 211 and the cutter 7 by the film detection sensor 211. Accordingly, in case that the cutting of the laminate film 24 is insufficient, it is possible to stop the succeeding process, to take an appropriate action to recover from the failure, and to prevent the printed ID card 31 from being spoilt.

What is claimed is:

1. A lamination system comprising: a first transfer means for transferring a continuous laminate film with a heat-adhesive layer drawn out from a supply roll along a film transfer path, a cutting means provided at the downstream of said first transfer means for cutting said laminate film into a predetermined length, a second transfer means provided at the downstream of said cutting means for transferring cut laminate film along said film transfer path, a card transfer means for transferring a card along a card transfer path that converges with said film transfer path at a predetermined point of convergence, a thermocompression bonding means for laminating said cut laminate film with said card at the downstream of said point of convergence, wherein a means for detecting a failure in cutting said laminate film is provided, and wherein said means for detecting said failure in cutting said laminate film comprises a film detection means provided at the downstream of said second transfer means, a leading edge of said laminate film is detected by said film detection means, said laminate film is pulled back toward the upstream after cutting action of said cutting means, said cutting is judged to have failed in cutting said laminate film if an output signal of said film detection means becomes inactivated.

2. The lamination system according to claim 1, wherein a transfer force of said first transfer means is larger than a transfer force of said second transfer means, said laminate film is pulled back toward the upstream after cutting action of said cutting means by said first transfer means only, said laminate film is slipped in said second transfer means while being pulled back.

3. A lamination system comprising: a first transfer means for transferring a continuous laminate film with a heat-adhesive layer drawn out from a supply roll alone a film transfer path, a cutting means provided at the downstream of said first transfer means for cutting said laminate film into a predetermined length, a second transfer means provided at the downstream of said cutting means for transferring cut laminate film a along said film transfer path, a card transfer means for transferring a card along a card transfer path that converges with said film transfer path at a predetermined point of convergence, a thermocompression bonding means for laminating said cut laminate film with said card at the downstream of said point of convergence, wherein a means for detecting a failure in cutting said laminate film is provided, wherein said means for detecting said failure in cutting said laminate film comprises a film detection means provided between said cutting means and said second transfer means, said film detection means detects the existing of said laminate film, a control means for controlling transfer of said laminate film is provided, said control means controls transfer of said laminate film, after a leading edge of said laminate film is detected by said film detection means, to be a predetermined amount, said cutting means is driven to cut said laminate film when transferred length of said laminate film reaches said predetermined amount, then cut laminate film is further transferred by a predetermined amount, then said existing of said laminate film is examined by said film detection means, said cutting is judged to have failed in cutting said laminate film if said existing of said laminate film is detected.

* * * * *